(12) United States Patent
Hagmann et al.

(10) Patent No.: US 7,887,111 B2
(45) Date of Patent: Feb. 15, 2011

(54) GRIPPER FOR MOVING AND POSITIONING CONTACT LENSES

(75) Inventors: Peter Hagmann, Erlenbach am Main (DE); Günter Lässig, Obernburg (DE); Roger Biel, Aschaffenburg (DE)

(73) Assignee: Novartis AG, Basel (CH)

( * ) Notice: Subject to any disclaimer, the term of this patent is extended or adjusted under 35 U.S.C. 154(b) by 599 days.

(21) Appl. No.: 11/983,883

(22) Filed: Nov. 13, 2007

(65) Prior Publication Data

US 2008/0084080 A1    Apr. 10, 2008

(30) Foreign Application Priority Data

May 13, 2005   (EP)   .................................. 05010469

(51) Int. Cl.
*B25J 15/08*    (2006.01)
(52) U.S. Cl. ........................ 294/87.1; 294/88; 294/106; 294/902
(58) Field of Classification Search .................. 294/1.2, 294/87.1, 88, 106, 115, 902; 414/226.01, 414/226.02; 901/39
See application file for complete search history.

(56) References Cited

U.S. PATENT DOCUMENTS

| 4,093,291 | A | * | 6/1978 | Schurgin | ..................... 294/1.2 |
| 4,427,226 | A | | 1/1984 | Shartzer | ................... 294/1 CA |
| 4,750,771 | A | | 6/1988 | Emmett et al. | ............. 294/99.2 |
| 4,752,094 | A | * | 6/1988 | Tabeau | ......................... 294/88 |
| 4,911,598 | A | * | 3/1990 | Sarvary et al. | ......... 414/226.01 |
| 4,950,011 | A | * | 8/1990 | Borcea et al. | ................... 294/2 |
| 5,895,192 | A | * | 4/1999 | Parnell et al. | .......... 414/225.01 |
| 6,502,876 | B1 | | 1/2003 | Stockhorst et al. | ......... 294/64.1 |
| 6,558,584 | B1 | | 5/2003 | O'Neill et al. | ................ 264/1.1 |
| 6,869,549 | B2 | | 3/2005 | Ansell et al. | .................. 264/2.3 |
| 6,916,055 | B2 | * | 7/2005 | Hu | .............................. 294/100 |
| 6,994,386 | B2 | | 2/2006 | Hagmann et al. | .......... 294/64.1 |
| 2003/0160343 | A1 | | 8/2003 | Hodgkinson | ................ 264/1.1 |

OTHER PUBLICATIONS

International Search Report for PCT/EP2006/004432.

* cited by examiner

*Primary Examiner*—Dean J Kramer
(74) *Attorney, Agent, or Firm*—Sheng-Hsin Hu (57) ABSTRACT

The invention provides a contact lens gripper comprising a tweezers gripper having first and second gripper arms hingedly connected to an actuation support for moving the free ends of the arms towards and away from each other so as to grasp and release a soft contact lens. The invention also provides a contact lens gripping unit comprising a mounting bar to which a plurality of individual contact lens grippers are mounted at a predetermined distance from each other, wherein each of the individual grippers is a contact lens gripper according to any one of the preceding claims.

8 Claims, 11 Drawing Sheets

GRIPPER FOR MOVING AND POSITIONING CONTACT LENSES

This application claims benefit under 35 USC §119 of European patent application No. EP 05010469.4 filed May 13, 2005, the contents of which are incorporated herein by reference.

The instant invention deals with a contact lens gripper in accordance with the independent patent claim, as well as with a contact lens gripping unit comprising a plurality of such individual contact lens grippers. The instant invention also deals with a process for grasping a contact lens, using a contact lens gripper.

During manufacture of soft contact lenses, in particular—but not exclusively—of single wear soft contact lenses, the contact lenses have to be removed from the mold half to which they stick after opening of the respective mold. Although various measures have been suggested in order to make the contact lenses all stick to one dedicated type of mold half (e.g. to make them all stick to the male mold half), a completely reliable measure to achieve this result has hitherto not been found. Accordingly, the situation has to be dealt with that some of the lenses stick to the male mold half while others stick to the female mold half.

On the other hand, the manufacturing process necessarily must be a highly automated process in order to be able to offer contact lenses at a competitive price. This requires, that in such highly automated process the handling of the contact lens must also be automated, in particular the lenses have to be removed from the respective mold halves to which they stick after they have been molded and after the molds have been opened.

Since some of the lenses tend to stick to the respective mold half rather strongly, it has been suggested to apply a jet of water to the lenses (or alternatively to apply a puff of steam) as the lenses stick to the mold half so as to loosen them. The thus loosened lenses are then removed by automatic vacuum grippers, such as shown for example in EP-A-1136241 or in WO-A-03/080320. The vacuum grippers generate suction and thus remove the loosened lenses from the mold halves.

While the vacuum grippers hitherto used have been working well, they suffer from the disadvantage that at least some of the water that has been applied to the lenses in order to loosen them from the mold have is sucked into the vacuum pump, so that the vacuum pump must be cleaned from time to time and the manufacturing process must be interrupted. Such an interruption of the manufacturing process in turn affects the overall efficiency of the manufacturing process, let alone that the water sucked in can be detrimental to the vacuum pump.

It is therefore an objective of the invention to suggest a contact lens gripper that overcomes the disadvantages of the prior art contact lens grippers.

This objective is achieved in accordance with a first aspect, second aspect and the third aspect as described as follows:

In particular, according to a first aspect of the invention, the contact lens gripper comprises a tweezers gripper having first and second gripper arms connected to an actuation support for moving the free ends of the arms towards and away from each other so as to grasp and release the soft contact lens. With the aid of the gripper arms of the tweezers gripper the soft contact lens can be mechanically grasped thus eliminating the disadvantages of vacuum grippers, such as the unintentional sucking in of water into the vacuum pump and the associated need to clean the vacuum pump from time to time.

In an embodiment of the contact lens tweezers gripper according to the invention, the actuation support comprises set means for individually setting the distance from and the divergence angle to the longitudinal axis of the tweezers gripper for each gripper arm. This is advantageous with respect to the fact, that the gripper can be adjusted to different molds that may be used for contact lens manufacturing.

In a preferred embodiment of the contact lens tweezers gripper according to the invention, the gripper arms are hingedly connected to the actuation support. This is a technically simple embodiment from a constructional point of view. In addition, as will be explained in more detail, this embodiment allows to actuate the gripper arms in a simple manner.

According to a further preferred embodiment of the contact lens tweezers gripper according to the invention, the gripper arms are elastic at least in the region of their free ends. In particular, each gripper arm may comprise a rigid carrier arm which is provided at least in the region of its free end with an elastic sleeve, the tip of the respective elastic sleeve extending beyond the free end of its associated rigid carrier arm. The lens is grasped between the tips of the elastic sleeves of the gripper arms. Although the elastic sleeves may deform to a certain extent, they must on the other hand be stiff enough to remove the soft contact lens from the mold half to which it sticks.

In another preferred embodiment of the contact lens tweezers gripper according to the invention, the length of the rigid carrier arms as well as the length of the sleeves is equal so that as a result the gripper arms are of equal length. This is particularly advantageous when the contact lens is to be removed from a male mold half, as will be explained in further detail below.

In another preferred embodiment of the contact lens tweezers gripper according to the invention, the length of the rigid carrier arms is different, one of the carrier arms being longer and the other one being shorter, while the length of the sleeves is equal. As a result, the longer carrier arm being provided with its sleeve is longer than the shorter carrier arm being provided with its sleeve. Preferably, the tip of the sleeve of the longer carrier arm tapers towards its apex and has a rounded outwardly facing surface. This embodiment is advantageous when the contact lens is to be removed from a female mold half, as will be explained in further detail below.

According to a second aspect of the invention, a contact lens gripping unit is suggested comprising a mounting bar to which a plurality of individual contact lens grippers are mounted at a predetermined distance from each other. Each of the individual grippers is a contact lens gripper corresponding to one of the above-described embodiments.

In an embodiment of such a contact lens gripping unit the individual contact lens grippers of the contact lens gripping unit can be pneumatically actuated through a common pressure distribution channel which is provided in the mounting bar. Accordingly, only one single pressure source is necessary for allowing actuation of all contact lens grippers connected to the mounting bar.

According to a third aspect of the invention, a process for grasping a contact lens is suggested using a contact lens gripper corresponding to one of the above-described embodiments of the contact lens gripper. The process is suitable especially for removing a soft contact lens from a mold half and comprises the steps of:

placing the free end of the gripper arms of the contact lens tweezers gripper above the contact lens to be grasped, lowering the gripper in a manner such that the contact lens to be grasped is arranged between the free ends of the gripper arms actuating the gripper so as to move the gripper arms towards each other in order to grasp the contact lens.

Such a process is simple and reliable—vacuum grippers are no longer needed and the disadvantages associated with their use are eliminated, accordingly.

In one variant of the process according to the invention, the contact lens to be removed rests on a male mold half. A gripper having gripper arms of equal length is used in this variant, and during the step of actuating the gripper so as to move the gripper arms towards each other the gripper is simultaneously moved upwards in accordance with the shape of the male mold half on which the contact lens rests. This allows to reliably remove the contact lens from the male mold half while keeping it grasped between the free ends of the gripper arms.

In another variant of the process according to the invention, the contact lens to be removed rests on a female mold half. A gripper having gripper arms of different lengths is used in this variant, and during the step of lowering the gripper the (elastic) tip of the longer one of the gripper arms causes the contact lens to tilt to a position in which it is arranged between the free ends of the gripper arms. This allows to reliably remove the contact lens from the female mold half. In order to grasp the lens between the free ends of the gripper arms, the lens must first be tilted to a position in which it is arranged between the free ends of the gripper arms in order to enable grasping of the lens.

Further advantageous aspects of the invention will become apparent from the following description of preferred embodiments of the contact lens tweezers gripper, of the gripper unit, and of the process for grasping a contact lens, with the aid of the drawings in which.

Figure 1:
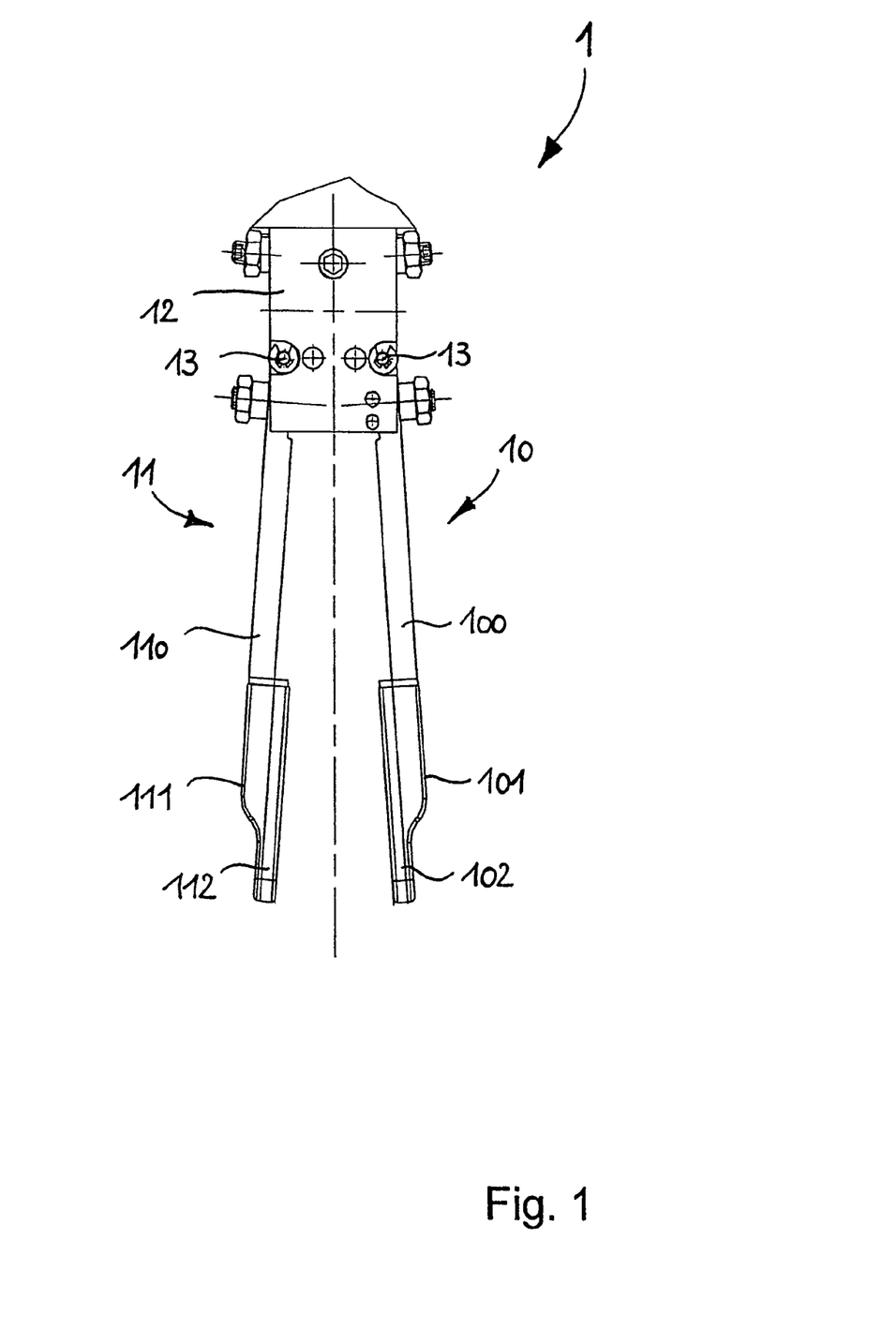
FIG. 1 a first embodiment of a contact lens gripper according to the invention FIG. 2 a first embodiment of a contact lens gripping unit according to the invention, comprising a plurality of contact lens grippers of FIG. 1
Figure 18:
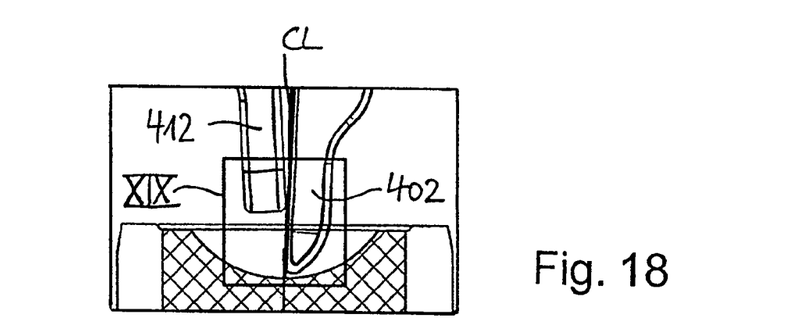
Figure 19:
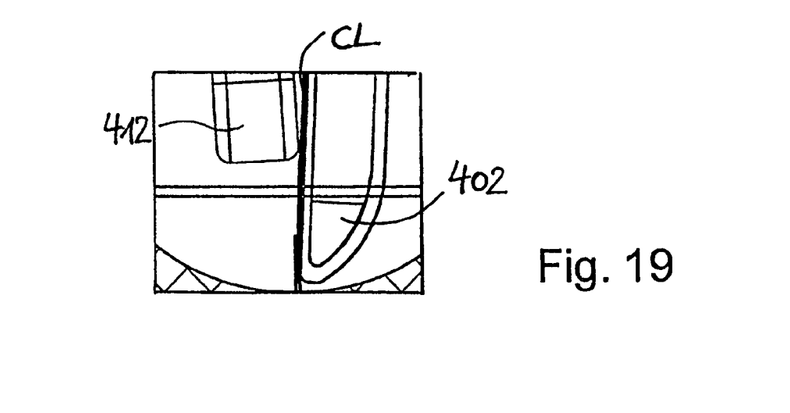
Figure 20:
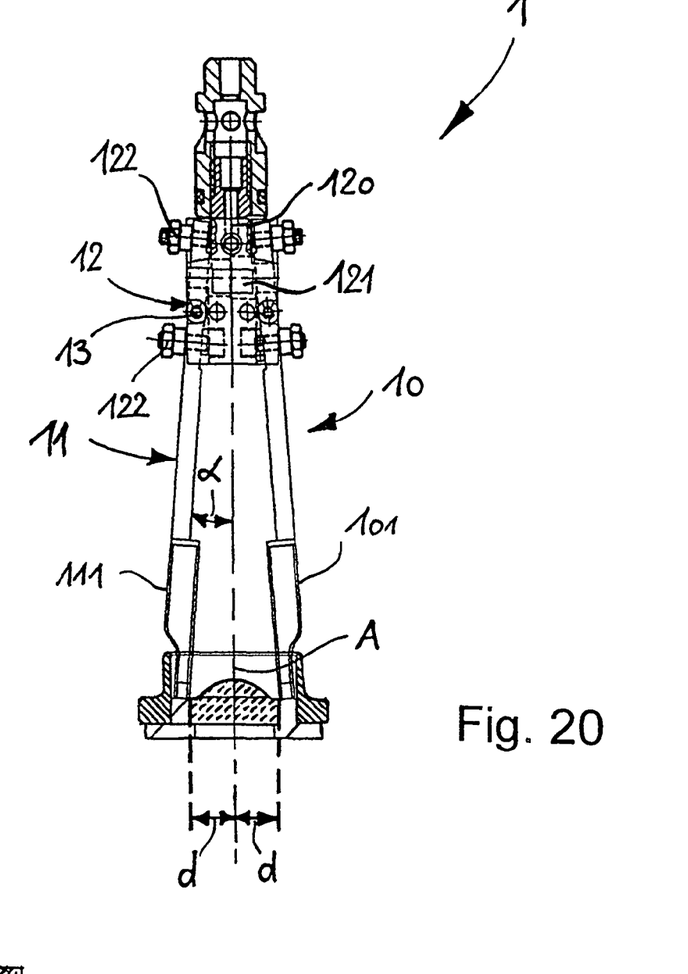
Figure 21:
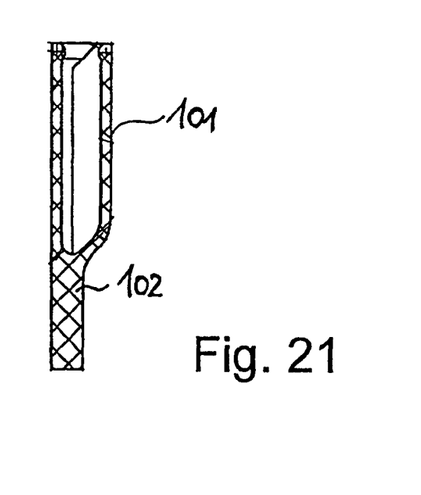
Figure 22:
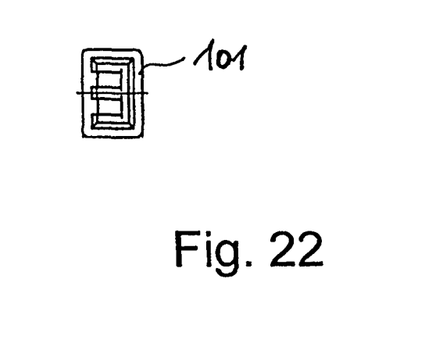

FIG. 13-19 the free ends of the elastic sleeves of the gripper arms of the contact lens gripper of FIG. 11 in sequential positions during the process of grasping a soft contact lens and removing it from a female mold half FIG. 20 the gripper of FIG. 1 with some additional details being shown FIG. 21-22 the sleeve of the gripper arms of the gripper of FIG. 1, in a cross-sectional view and in a view from above, respectively In FIG. 1 a first embodiment of a contact lens gripper in accordance with the invention is shown. The gripper 1 comprises a first gripper arm 10 and a second gripper arm 11, which are hingedly connected to an actuation support 12 via a respective hinge 13. First gripper arm 10 comprises a rigid carrier arm 100 that is provided in the region of its free end with an elastic sleeve 101 (see also FIG. 21 and FIG. 22). Elastic sleeve 101 can be mounted to carrier arm 100 by pushing it over the free end of rigid carrier arm 100. When mounted, tip 102 of elastic sleeve 101 extends beyond the free end of rigid carrier arm 100. Correspondingly, second gripper arm 11 comprises a rigid carrier arm 110 that is provided in the region of its free end with an elastic sleeve 111 that has been mounted to carrier arm 110 as has been described above for elastic sleeve 101 and carrier arm 100. Again, when mounted, tip 112 of elastic sleeve 111 extends beyond the free end of rigid carrier arm 110. The length of rigid carrier arms 100 and 110 is equal. Similarly, the length of elastic sleeves 101 and 111 is equal, so that as a result first and second gripper arms 10 and 11 are of equal length.

Actuation support 12 is constructed such (see FIG. 20), that gripper arms 10 and 11 may be pneumatically actuated by a pressure supply. Therefore, actuation support 12 is provided with a pressure inlet 120 and an actuation cylinder 121 which may be activated by pressure so as to be expanded. Upon expansion, actuation cylinder 121 engages gripper arms 10 and 11 at a location above hinge 13 and pushes them outwardly. As a result, the free ends of gripper arms 10 and 11, i.e. tips 102 and 112 of sleeves 101 and 111, are moved towards each other.

Set screws 122 are provided for individually setting the initial distance d between the tip 102 or 112, respectively, and the central axis A of gripper 1, as well the divergence angle α between gripper arms 10 and 11, respectively, and central axis A. During the setting of distance d and of angle α actuation cylinder 121 is in the relaxed state (i.e. not expanded). By setting distance d and angle α gripper 1 can be perfectly adjusted to the dimensions of the mold half from which the contact lens has to be removed.

Figure 2:
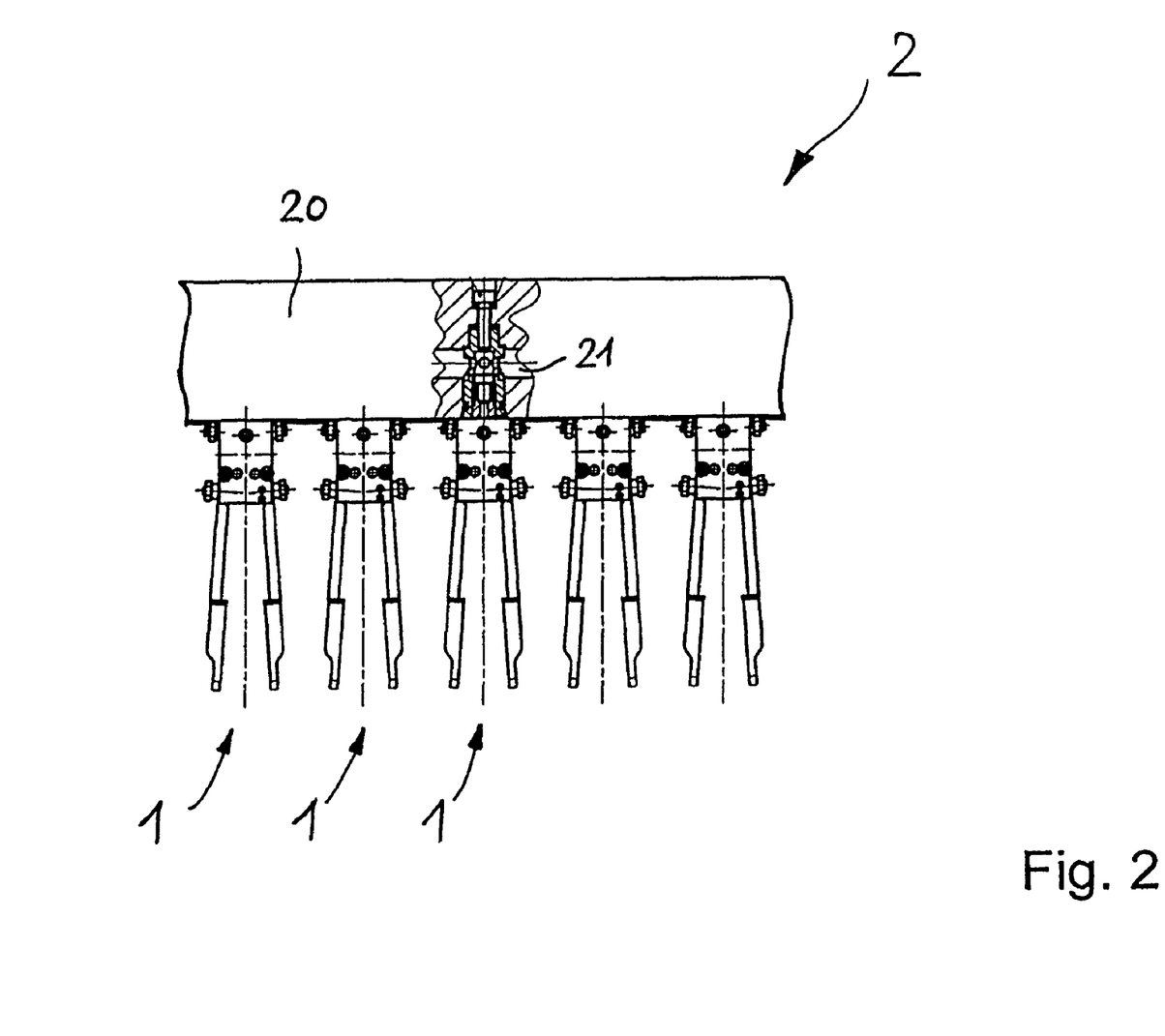

FIG. 2 shows a first embodiment of a contact lens gripping unit 2 according to the invention. Gripping unit 2 comprises a mounting bar 20 to which a plurality of individual contact lens grippers 1 as described above is mounted—in the embodiment shown, five individual grippers 1 are seen mounted to mounting bar 20, but any other number is conceivable. A common pressure distribution channel 21 may be provided within mounting bar 20 so that the individual grippers 1 may be pneumatically actuated with only one external pressure supply.

Figure 3:
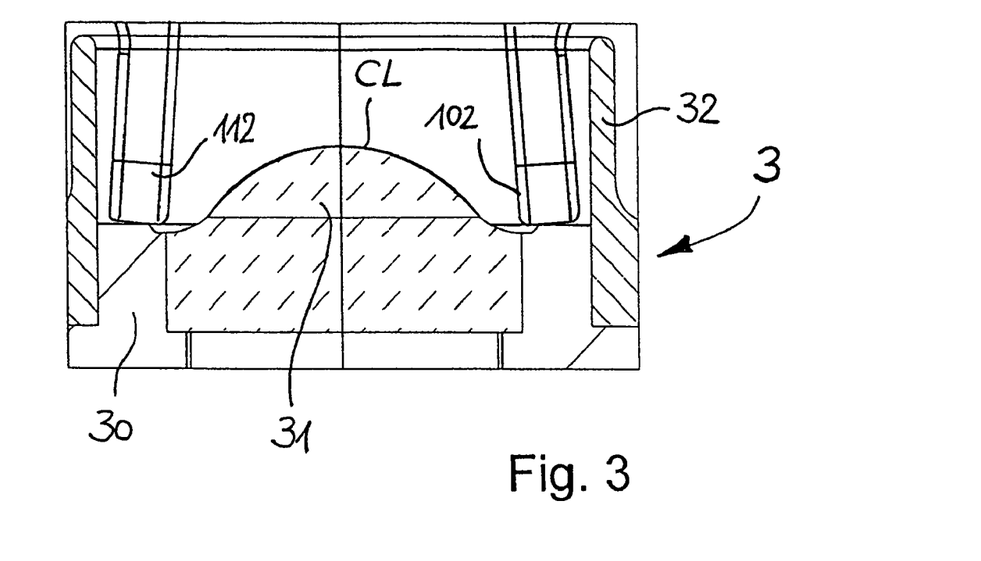
FIG. 3-5 the free ends of the elastic sleeves of the gripper arms of the contact lens gripper of FIG. 1 in sequential positions during the process of grasping a soft contact lens and removing it from a male mold half FIG. 6 an enlargement of detail VI of FIG. 5

With the aid of FIGS. 3-10 one variant of how a contact lens can be removed from a male mold half to which it sticks after opening of the mold will now be described. In FIG. 3 the tips 102 and 112 of sleeves 101 and 111 of gripper arms 10 and 11 have been lowered until they touch portion 30 of male mold half 3 that surrounds the lens-shaping insert 31. An additional guiding sleeve 32 is shown in FIG. 3 the purpose of which is not relevant for the understanding of the instant invention. In the position shown in FIG. 3, the gripper arms are not actuated (i.e. the actuation cylinder 121—see FIG. 20—is not expanded). The contact lens CL to be grasped is located between the free ends of grippers arms 10 and 11, that is to say between the tips 102 and 112 of sleeves 101 and 111.

Figure 4:
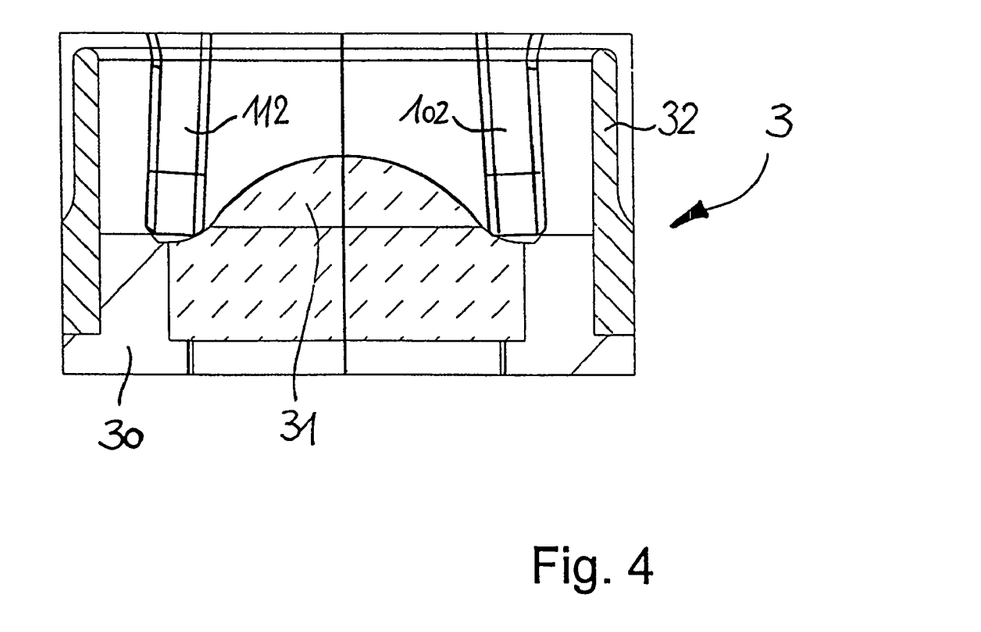
Figure 5:
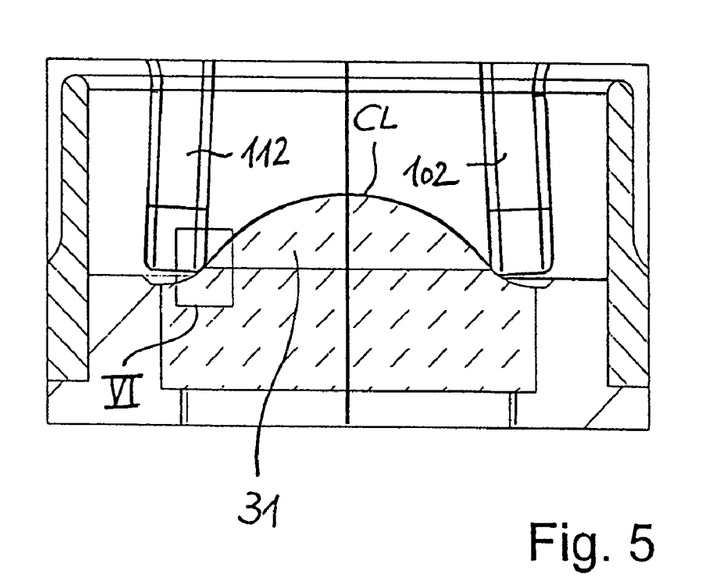

The gripper arms 10 and 11 are then actuated so as to move towards each other. A situation in which this movement of gripper arms 10 and 11 has just begun is shown in FIG. 4. Gripper arms 10 and 11 are then further moved towards each other until they engage contact lens CL that rests on lens-shaping insert 31. This is shown in FIG. 5, and in particular detail VI of FIG. 5 is shown enlarged in FIG. 6. It is to be noted, that tip 112 shown in FIG. 6 engages contact lens CL such that the rear part of the edge of contact lens cannot be damaged, since this rear part of the contact lens edge significantly affects the wearing comfort of contact lens CL.

Figure 7:
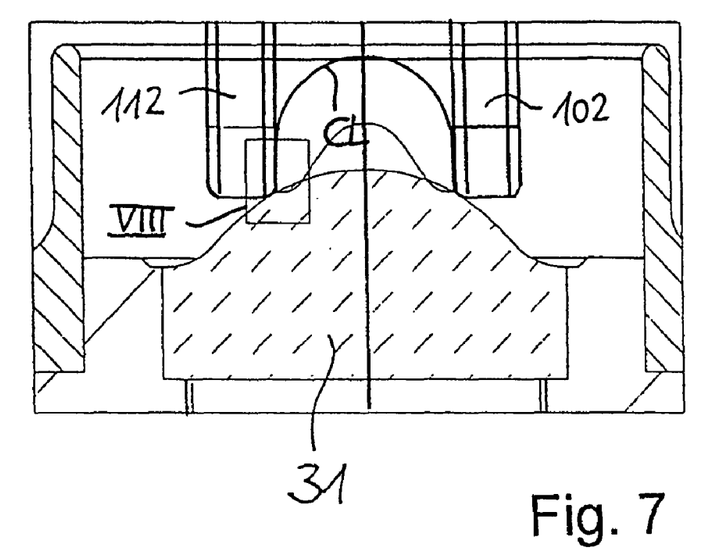
FIG. 7 a further sequential position of the free ends of the elastic sleeves during the process of grasping the contact lens and removing it from the male mold half FIG. 8 the detail VIII of FIG. 7
Figure 8:
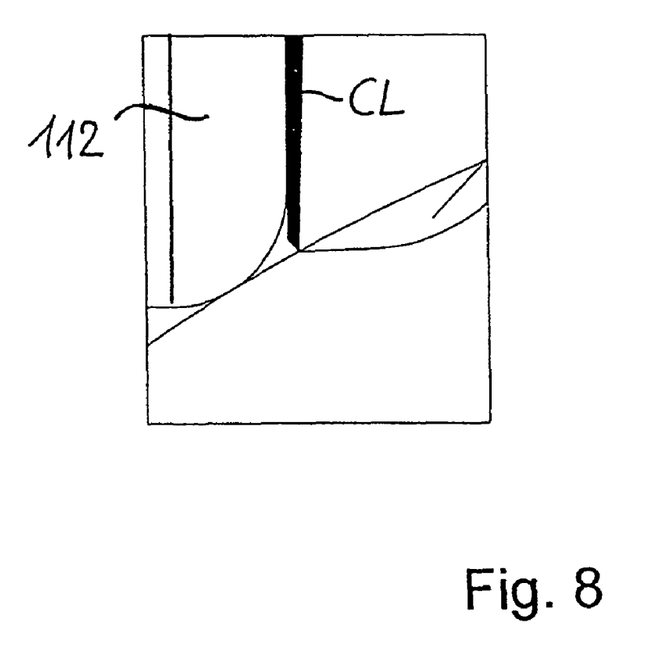
Figure 9:
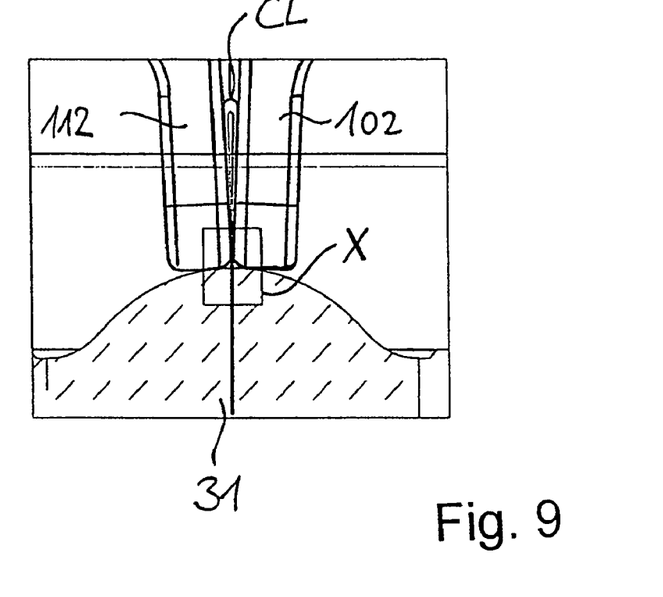
FIG. 9 the final sequential position of the free ends of the elastic sleeves with the contact lens being securely grasped between the free ends FIG. 10 the detail X of FIG. 9
Figure 10:
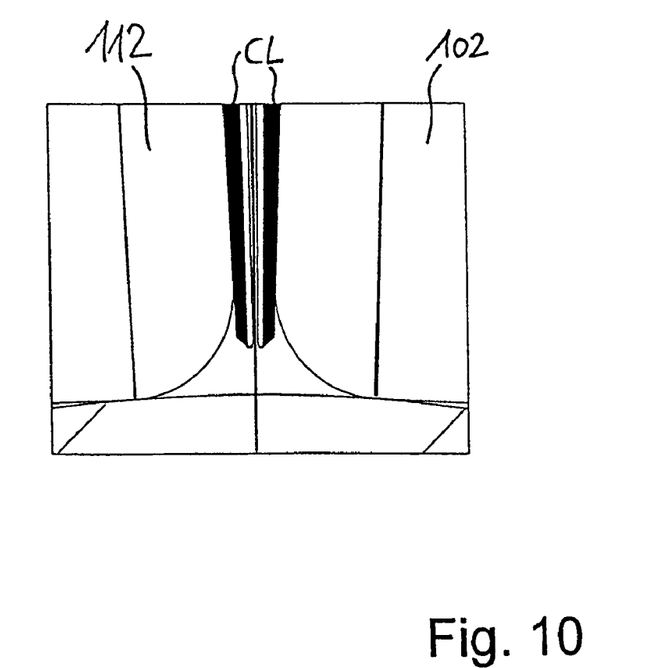

The gripper arms 10 and 11 and consequently also tips 112 and 102 of sleeves 111 and 101 are then further moved together and upwards in accordance with the shape of lens-shaping portion 31 so as to grasp contact lens CL and remove it from lens-shaping portion 31. A further intermediate position of this movement is shown in FIG. 7, with detail VIII of FIG. 7 being shown enlarged in FIG. 8. Moving gripper arms 10 and 11 (and consequently tips 112 and 102 of sleeves 111 and 101) towards each other and upwards results in that contact lens CL is fully grasped between tips 112 and 102, as this is shown in FIG. 9, with detail X being shown enlarged in FIG. 10. Contact lens CL has then been fully removed from lens-shaping portion 31 and can be transferred, for example, to an inspection station.

Figure 11:
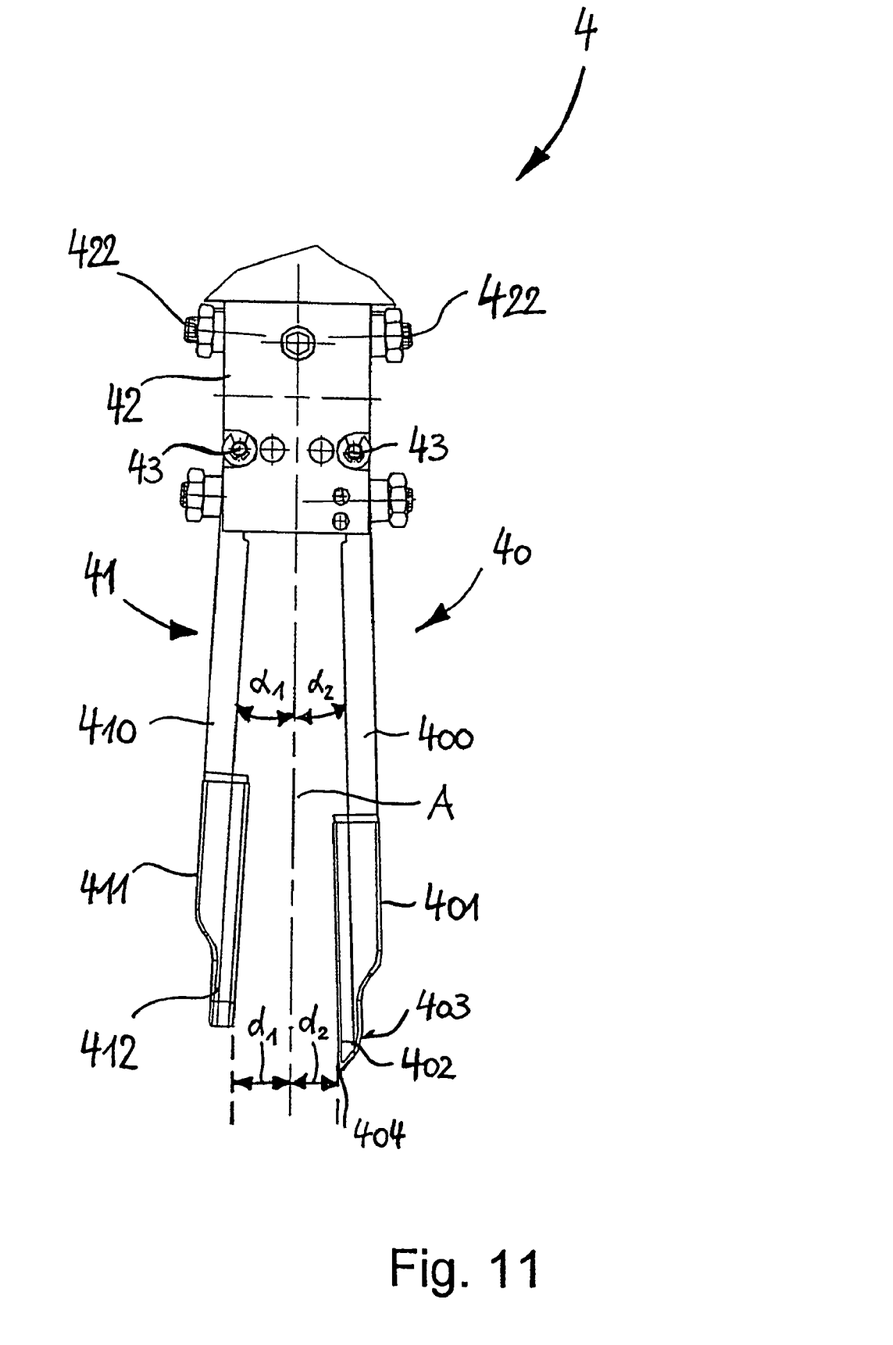
FIG. 11 a second embodiment of the contact lens gripper according to the invention FIG. 12 a second embodiment of the contact lens gripping unit according to the invention, comprising a plurality of contact lens grippers of FIG. 11

In FIG. 11 a second embodiment of a contact lens gripper in accordance with the invention is shown. The gripper 4 comprises a first gripper arm 40 and a second gripper arm 41, which are hingedly connected to an actuation support 42 via a respective hinge 43. First gripper arm 40 comprises a rigid carrier arm 400 that is provided in the region of its free end with an elastic sleeve 401. Elastic sleeve 401 can be mounted to carrier arm 400 by pushing it over the free end of rigid carrier arm 400. When mounted, tip 402 of elastic sleeve 401 extends beyond the free end of rigid carrier arm 400. Second gripper arm 41 comprises a rigid carrier arm 410 that is provided in the region of its free end with an elastic sleeve 411 that has been mounted to carrier arm 410 as has been described above for elastic sleeve 401 and carrier arm 400. Again, when mounted, tip 412 of elastic sleeve 411 extends beyond the free end of rigid carrier arm 410. However, in contrast to the embodiment of the gripper shown in FIG. 1 the length of rigid carrier arms 400 and 410 is not equal in the embodiment of the gripper shown in FIG. 11, while the length of elastic sleeves 401 and 411 is equal. As a result the first and second gripper arms 40 and 41 are of different length. Also, the shape of sleeve 401 is different from the shape of sleeve 411. While sleeve 411 is similar to the shape of sleeves 101 and 111 shown in FIG. 1 and in FIG. 21 and FIG. 22, respectively, sleeve 401 looks different, since it comprises a rounded outwardly facing surface 403 and tapers towards a pointed apex 404.

Actuation support 42 is constructed similar to actuation support 12 shown in FIG. 1 and FIG. 20, respectively, that is to say gripper arms 40 and 41 may be pneumatically actuated by a pressure supply and its working principle is similar to that already described above. Therefore, for a detailed description of the working principle of actuation support 42 it is referred to that part of the description where the working principle of actuation support 12 is described in more detail (see above).

Set screws 422 are provided for individually setting the initial distances $d_1$ and $d_2$ between the tip 402 or 412, respectively, and the central axis A of gripper 4, as well the divergence angles $\alpha_1$ and $\alpha_2$ between gripper arms 40 and 41, respectively, and central axis A. The distances $d_1$ and $d_2$ as well as the angles $\alpha_1$ and $\alpha_2$ are different in this embodiment of the gripper 4. During the setting of the distances $d_1$ and $d_2$ and of angles $\alpha_1$ and $\alpha_2$ actuation cylinder is in the relaxed state (i.e. not expanded). By setting the distances $d_1$ and $d_2$ and the angles $\alpha_1$ and $\alpha_2$ gripper 4 can be perfectly adjusted to the dimensions of the mold half from which the contact lens has to be removed.

Figure 12:
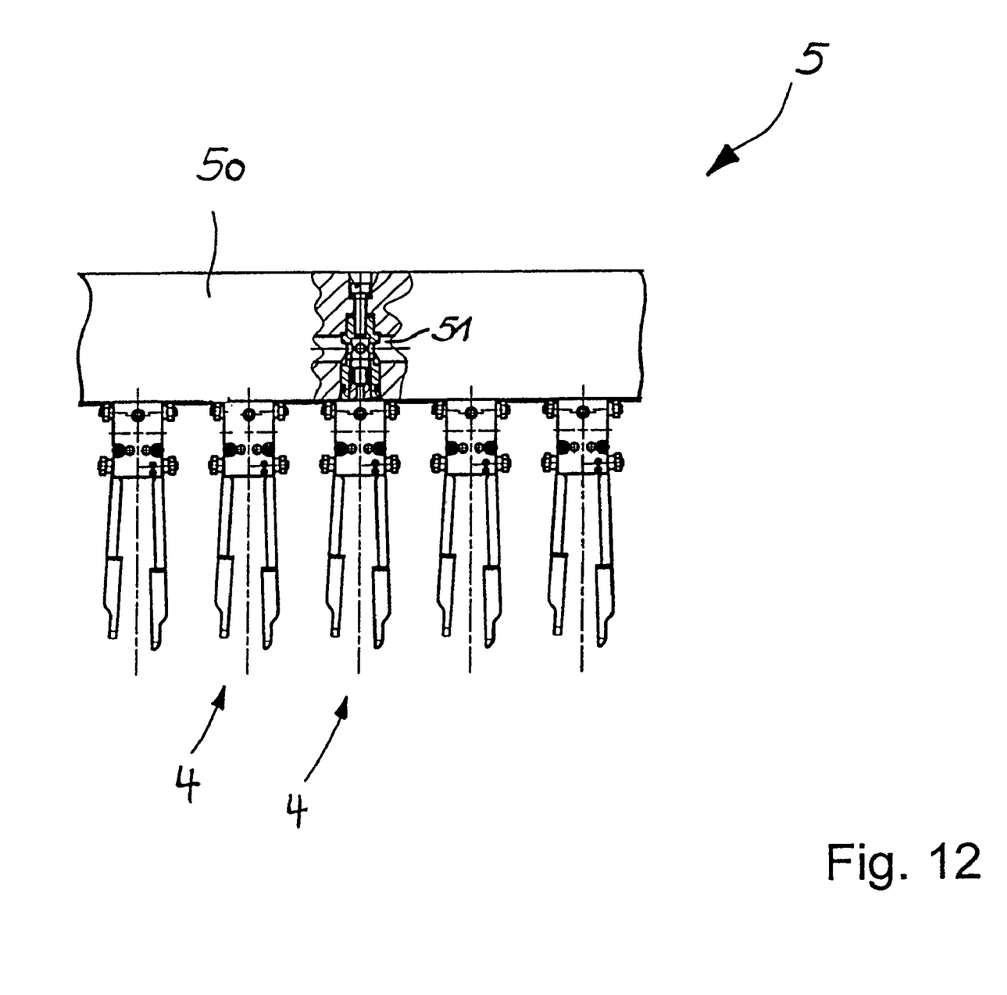

FIG. 12 shows a first embodiment of a contact lens gripping unit 5 according to the instant invention. Gripping unit 5 comprises a mounting bar 50 to which a plurality of individual contact lens grippers 4 as described above is mounted—in the embodiment shown, five individual grippers 4 are seen mounted to mounting bar 50, but any other number is conceivable. A common pressure distribution channel 51 may be provided within mounting bar 50 so that the individual grippers 4 may be pneumatically actuated with only one external pressure supply being needed.

Figures 13, 14:
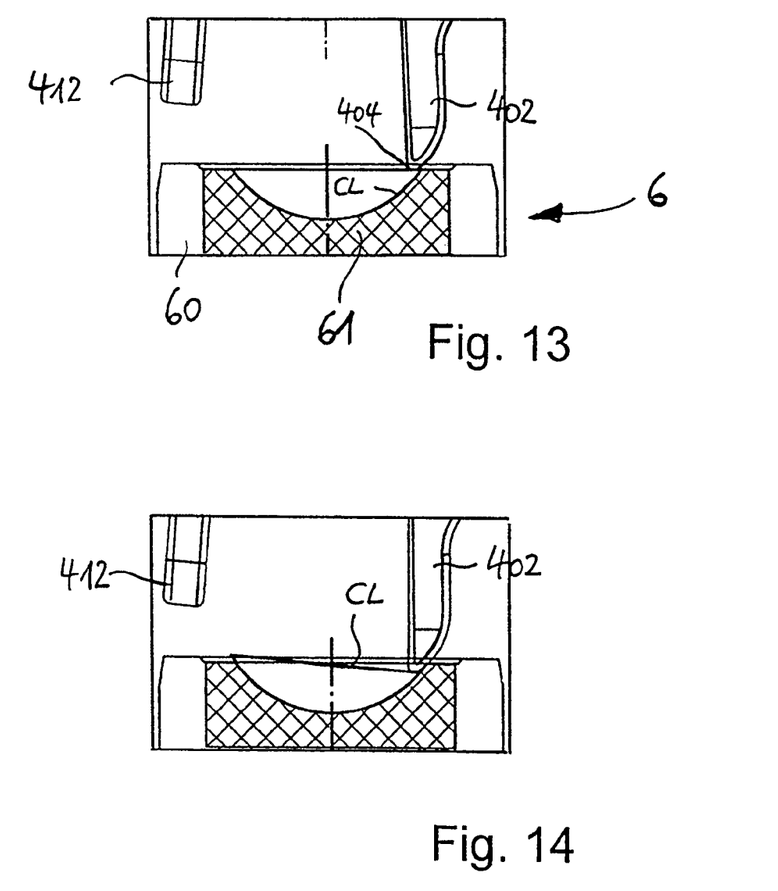
Figure 15:
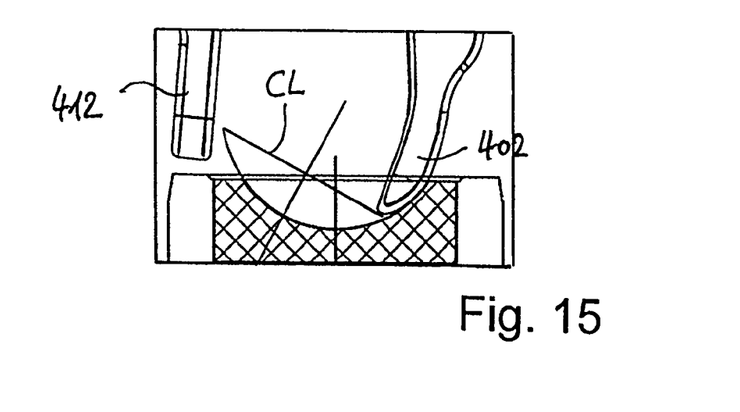
Figure 16:
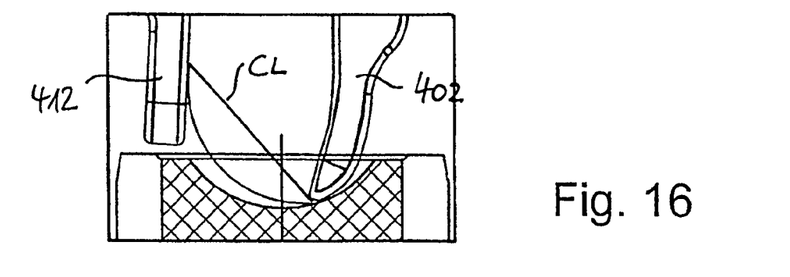
Figure 17:
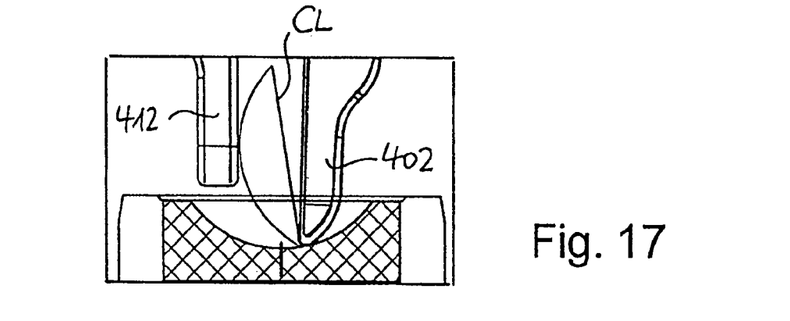

With the aid of FIGS. 13-19 one variant of how a contact lens can be removed from a female mold half to which it sticks after opening of the mold will now be described. In FIG. 13 the tips 402 and 412 of sleeves 401 and 411 of gripper arms 40 and 41 have been lowered until the apex 404 of tip 402 of sleeve 401 touches contact lens CL that rests in female lens-shaping insert 61 which is surrounded by portion 60 of female mold half 6. In the position shown in FIG. 13, the gripper arms are not actuated (i.e. the actuation cylinder is not expanded). Tip 412 of sleeve 411 of gripper arm 41 is located above female mold half 6. Gripper 4 and is then further lowered and consequently contact lens CL is slightly tilted, as this is shown in FIG. 14. Further downward movement of gripper 4 results in a slight deformation of tip 402 having the rounded outer surface and in further tilting of contact lens CL, as this is shown in FIG. 15 and in FIG. 16. The tips 402 and 412 are then moved towards each other so that the tilted lens is located between the free ends of gripper arms 40 and 41, that is to say between tips 402 and 412 of sleeves 401 and 411, so that it can be grasped (FIG. 17). Tips 402 and 412 are then further moved towards each other until contact lens CL is safely grasped between tips 402 and 412, as this is shown in FIG. 18 and FIG. 19, wherein FIG. 19 shows an enlarged view of detail XIX of FIG. 18. Contact lens CL has now been fully removed from female mold half 6, is securely held by gripper 4, and can now be transferred, for example, to an inspection station.

Figure 6:
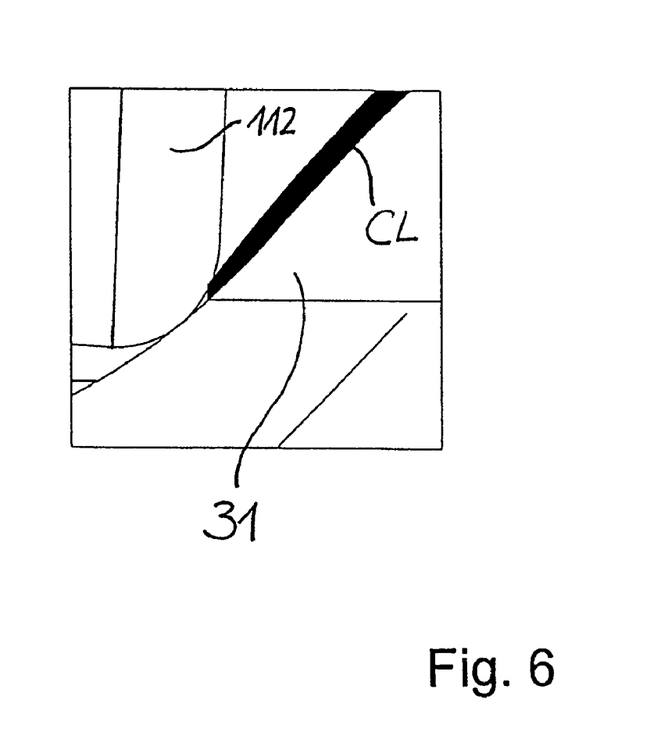

It is to be noted, that in a highly automated lens manufacturing process it may be possible, that it cannot be safely predicted, whether a molded soft contact lens sticks to the male mold half 3 or to the female mold half 6. Accordingly, it is advantageous for such manufacturing process to provide grippers for both types of mold halves, for the male mold halves 3 as well as for the female mold halves 6, so as to be sure that the lens can be automatically removed from the mold half (e.g. after having been loosened from the respective mold half by means of a water jet).

While the invention has been described with the aid of specific embodiments or variants, it is to be understood that numerous changes and modifications can be made without departing from the spirit and scope of the invention, which is defined by the appended claims.

The invention claimed is:

1. A contact lens gripper comprising a tweezers gripper having first and second gripper arms connected to an actuation support for moving the free ends of the arms towards and away from each other so as to grasp and release a soft contact lens, wherein the gripper arms are hingedly connected to the actuation support and wherein the actuation support comprises set means for individually setting the distance from and the divergence angle to the longitudinal axis of the tweezers gripper for each gripper arm, wherein the gripper arms are elastic at least in the region of their free ends, wherein each gripper arm comprises a rigid carrier arm which is provided at least in the region of its free end with an elastic sleeve, the tip of the respective elastic sleeve extending beyond the free end of its associated rigid carrier arm.

2. The contact lens gripper according to claim 1, wherein the length of the rigid carrier arms as well as the length of the sleeves is equal so that as a result the gripper arms are of equal length.

3. The contact lens gripper according to claim 1, wherein the length of the rigid carrier arms is different, one of the carrier arms being longer and the other one being shorter, while the length of the sleeves is equal, so that as a result the longer carrier arm being provided with its sleeve is longer than the shorter carrier arm being provided with its sleeve, and wherein the tip of the sleeve of the longer arm tapers towards its apex and has a rounded outwardly facing surface.

4. A contact lens gripping unit comprising a mounting bar to which a plurality of individual contact lens grippers are mounted at a predetermined distance from each other, wherein each of the individual grippers is a contact lens gripper according to any one of the preceding claims.

5. The contact lens gripping unit according to claim 4, wherein the individual contact lens grippers of the contact lens gripping unit can be pneumatically actuated through a common pressure distribution channel which is provided in the mounting bar.

6. A process for grasping a contact lens using a contact lens gripper according to any one of claims 1 or 5, for removing a soft contact lens from a mold half, the process comprising the steps of:

placing the free end of the gripper arms of the contact lens tweezers gripper above the contact lens to be grasped, lowering the gripper in a manner such that the contact lens to be grasped is arranged between the free ends of the gripper arms actuating the gripper so as to move the gripper arms towards each other in order to grasp the contact lens.

7. The process according to claim 6, wherein the contact lens to be removed rests on a male mold half, and wherein a gripper having gripper arms of equal length is used, in which process during the step of actuating the gripper so as to move the gripper arms towards each other the gripper is simultaneously moved upwards in accordance with the shape of the male mold half on which the contact lens rests.

8. The process according to claim 6, wherein the contact lens to be removed rests on a female mold half, and wherein a gripper having gripper arms of different lengths is used, in which process during the step of lowering the gripper the tip of the longer one of the gripper arms causes the contact lens to tilt to a position in which it is arranged between the free ends of the gripper arms.

* * * * *